US008638324B2

(12) United States Patent
Lee et al.

(10) Patent No.: US 8,638,324 B2
(45) Date of Patent: Jan. 28, 2014

(54) DISPLAY DEVICE AND DRIVING METHOD THEREOF

(75) Inventors: So-Hyun Lee, Yongin-si (KR); Joon-Ha Park, Busan (KR); Il-Gon Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 1034 days.

(21) Appl. No.: 11/930,251

(22) Filed: Oct. 31, 2007

(65) Prior Publication Data

US 2008/0129720 A1 Jun. 5, 2008

(30) Foreign Application Priority Data

Dec. 4, 2006 (KR) ........................ 10-2006-0121681

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.

USPC ................................ 345/208; 345/87; 345/92

(58) Field of Classification Search

USPC .................................................. 345/208, 209

See application file for complete search history.

(56) References Cited

U.S. PATENT DOCUMENTS

2006/0187164 A1* 8/2006 Okuno ............................ 345/92
2008/0204390 A1* 8/2008 Moon ............................. 345/87

FOREIGN PATENT DOCUMENTS

| | | | |
|---|---|---|---|
| JP | 04-223428 | A | 8/1992 |
| JP | 07318901 | A | 12/1995 |
| JP | 09-159998 | A | 6/1997 |
| JP | 11-337911 | A | 12/1999 |
| JP | 2000-284304 | | 10/2000 |
| JP | 2000-284304 | A | 10/2000 |
| JP | 2001-281626 | | 10/2001 |
| JP | 2003-177375 | A | 6/2003 |
| JP | 2006-235627 | A | 9/2006 |
| JP | 2006313349 | A | 11/2006 |
| KR | 19990080838 | A | 11/1999 |
| KR | 1020030048347 | A | 6/2003 |
| KR | 1020050110096 | A | 11/2005 |

* cited by examiner

*Primary Examiner* — Charles V Hicks

(74) *Attorney, Agent, or Firm* — Cantor Colburn LLP

(57) ABSTRACT

In a display device, a line inversion driving chip inverts an image data to a data voltage having a positive polarity and a data voltage having a negative polarity based on positive and negative gammas alternately applied at every period, and alternately outputs a first data voltage having a first polarity and a second data voltage having a second polarity at a period less than or equal to a 1H period. A display panel includes a plurality of pixels receiving the first and second data voltages from the line inversion driving chip to display an image. Each pixel row includes first and second pixel groups receiving the first and second data voltages, respectively, and the first and second pixel groups are alternately arranged in each pixel row. Thus, the display device may be driven in a dot inversion method.

19 Claims, 10 Drawing Sheets

DISPLAY DEVICE AND DRIVING METHOD THEREOF

This application claims priority to Korean Patent Application No. 2006-121681 filed on Dec. 4, 2006, and all the benefits accruing therefrom under 35 U.S.C. §119, the contents of which in its entirety are herein incorporated by reference.

BACKGROUND OF THE INVENTION

1. Field of the Invention

The present invention relates to a display device and a driving method thereof. More particularly, the present invention relates to a display device capable of realizing a dot inversion drive operation, and a dot inversion driving method of the display device.

2. Description of the Related Art

In general, a liquid crystal display ("LCD") includes a color filter substrate, an array substrate facing the color filter substrate, and a liquid crystal layer interposed between the color filter substrate and the array substrate. The color filter substrate includes a color filter layer and a common electrode, and the array substrate includes a pixel electrode facing the common electrode.

The common electrode receives a common voltage, and the pixel electrode receives a data voltage. Thus, an electric field is generated between the pixel electrode and the common electrode, which is caused by a voltage difference between the common voltage and the data voltage. Liquid crystal molecules included in the liquid crystal layer are aligned by the electric field, so that the LCD controls a light transmittance of the liquid crystal layer, thereby displaying a desired image.

However, when the data voltage having a fixed polarity with respect to the common voltage is continuously applied to the pixel electrode at every frame, the liquid crystal molecules included in the liquid crystal layer deteriorate. Thus, in order to prevent the deterioration of the liquid crystal molecules, recently, an inversion drive method has been adopted for the LCD.

The inversion drive method is classified into a frame inversion method, a line inversion method, and a dot inversion method. The frame inversion method inverts the polarity of the data voltage with respect to the common voltage having a direct current shape at every frame, and the line inversion method inverts the polarity of the data voltage with respect to the common voltage having an alternating current shape for at least every one line. The dot inversion method inverts the polarity of the data voltage at every pixel.

When the LCD adopts the above-described inversion methods, the deterioration of the liquid crystal molecules is prevented. However, when the LCD adopts the frame inversion method or the line inversion method, a flickering phenomenon occurs. The flickering phenomenon is more minimized in the dot inversion method than in the line or frame inversion drive method.

BRIEF SUMMARY OF THE INVENTION

The present invention provides a display device capable of driving a display panel in a dot inversion drive method using a line inversion driving chip.

In exemplary embodiments of the present invention, a display device includes a controller, a line inversion driving chip, a gate driving circuit, and a display panel.

The controller receives an image data from an external device, outputs the image data in synchronization with a first timing signal, and outputs a second timing signal. The line inversion driving chip receives the image data, inverts the image data to a first data voltage having a first polarity and a second data voltage having a second polarity different from the first polarity based on a positive gamma and a negative gamma alternately applied at every horizontal scanning period, where the horizontal scanning period is a 1H period, and alternately outputs the first data voltage and the second data voltage at a period that is equal to or less than the 1H period.

The gate driving circuit outputs a gate signal during the 1H period in response to the second timing signal. The display panel includes a plurality of pixels that receive the first and second data voltages in response to the gate signal and are arranged in a plurality of pixel rows to display an image. The pixels in each pixel row are divided into a first pixel group and a second pixel group receiving the first and second data voltages, respectively, the first and second pixel groups are alternately arranged in each pixel row, and a polarity of a data voltage applied to the first and second pixel groups is inverted at every pixel row.

In other exemplary embodiments of the present invention, a display device includes a line inversion driving chip that outputs first and second data voltages, and inverts a polarity of the data voltages, a gate driving circuit that outputs gate signals, and a display panel including a plurality of data lines that receives the data voltages from the line inversion driving chip, a plurality of gate lines that receives the gate signals from the gate driving circuit, and a plurality of rows of pixels, each pixel row including pixels that are alternatingly arranged to receive gate signals from the gate driving circuit by adjacent gate lines, wherein the display panel is driven by a dot inversion method.

In still other exemplary embodiments of the present invention, a dot inversion method of driving a display panel of a display device includes providing image data to a line inversion driving chip of the display device, inverting the image data to a first data voltage having a first polarity and a second data voltage having a second polarity different from the first polarity, outputting the first data voltage and the second data voltage at a period that is equal to or less than a 1H period to the display panel, each pixel row of the display panel divided into a first pixel group and a second pixel group receiving the first and second data voltages, respectively, and the first and second pixel groups being alternately arranged in each pixel row, and, inverting, at every pixel row, a polarity of a data voltage applied to the first and second pixel groups.

According to the above, the line inversion driving chip outputs the data voltage corresponding to one row during the 1H period, and the polarity of the data voltage is inverted at every period equal to or less than the 1H period. The display panel includes two gate lines in order to turn on one pixel row, so that the display panel may be driven in a dot inversion method.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
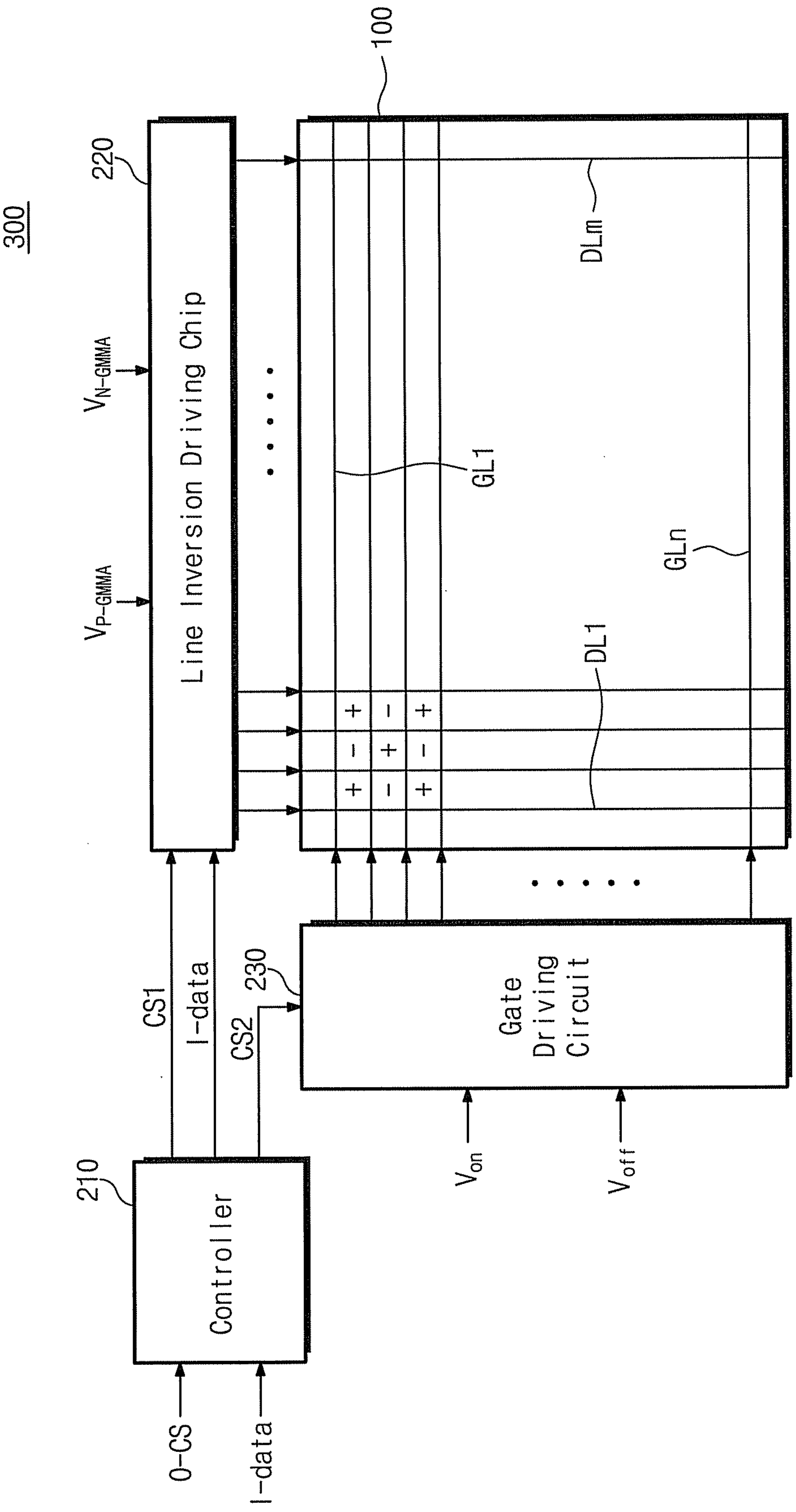
FIG. 1 is a block diagram showing an exemplary embodiment of a liquid crystal display ("LCD") according to the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being “on”, “connected to” or “coupled to” another element or layer, it can be directly on, connected or coupled to the other element or layer or intervening elements or layers may be present. In contrast, when an element is referred to as being “directly on,” “directly connected to” or “directly coupled to” another element or layer, there are no intervening elements or layers present. Like numbers refer to like elements throughout. As used herein, the term “and/or” includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, “a”, “an” and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention are described herein with reference to layout and cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

FIG. 1 is a block diagram showing an exemplary embodiment of a liquid crystal display (“LCD”) according to the present invention.

Referring to FIG. 1, an LCD 300 includes a display panel 100, a controller 210, a line inversion driving chip 220, and a gate driving circuit 230.

The display panel 100 includes first to m-th data lines DL1~DLm, first to n-th gate lines GL1~GLn, and n×m pixels. The first to m-th data lines DL1~DLm are intersecting with and insulated from the first to n-th gate lines GL1~GLn. In an exemplary embodiment, n×m pixels areas may be provided in a matrix configuration. The n×m pixels are arranged in the n×m pixel areas in one-to-one correspondence relationship.

A circuit configuration of each pixel will be described below with reference to FIGS. 2 and 3.

With further reference to FIG. 1, the controller 210 receives an external control signal O-CS and an image data I-data from an external device (not shown). In the present exemplary embodiment, the external control signal O-CS includes a vertical synchronization signal, a horizontal synchronization signal, a main clock, and a data enable signal. The controller 210 generates a data control signal CS1 and a gate control signal CS2 based on the external control signal O-CS.

The controller 210 sequentially applies the image data I-data to the line inversion driving chip 220 in synchronization with the data control signal CS1. In the present exemplary embodiment, the data control signal CS1 includes a horizontal start signal starting a drive of the line inversion driving chip 220, an inversion signal inverting a polarity of a data voltage, and an output indication signal indicating an output time of the data voltage.

Also, the line inversion driving chip 220 alternately receives a positive gamma reference voltage $V_{P\text{-}GMMA}$ and a negative gamma reference voltage $V_{N\text{-}GMMA}$ at every horizontal scanning period (hereinafter, referred to as 1H period). Although not shown in FIG. 1, the positive gamma reference voltage $V_{P\text{-}GMMA}$ and the negative gamma reference voltage $V_{N\text{-}GMMA}$ are generated from a gamma voltage generator and applied to the line inversion driving chip 220.

The line inversion driving chip 220 inverts the image data I-data to a data voltage having a positive polarity based on the positive gamma reference voltage $V_{P\text{-}GMMA}$ and inverts the image data I-data to a data voltage having a negative polarity based on the negative gamma reference voltage $V_{N\text{-}GMMA}$. Thus, the line inversion driving chip 220 may alternately output the data voltage having the positive polarity and the data voltage having the negative polarity at every 1H period.

The data voltage having the positive polarity and the data voltage having the negative polarity are alternately output from the line inversion driving chip 220 at every 1H period and applied to the first to m-th data lines DL1~DLm of the display panel 100.

The gate driving circuit 230 sequentially outputs a gate signal that swings between a gate-on voltage Von and a gate-off voltage Voff in response to the gate control signal CS2 from the controller 210. In the present exemplary embodiment, the gate control signal CS2 includes a vertical start signal starting a drive of the gate driving circuit 230, a gate clock signal deciding an output time of a gate pulse, and an output enable signal deciding a pulse width of the gate signal.

The gate signal is sequentially applied to the first to n-th gate lines GL1~GLn arranged in the display panel 100. Thus, the display panel 100 displays an image corresponding to the data voltage applied to the data lines DL1~DLm in response to the gate signal applied to the gate lines GL1~GLn.

In an exemplary embodiment, the line inversion driving chip 220 may be mounted on the display panel 100, and the gate driving circuit 230 may be directly formed on the display panel 100 through a thin film process.

Figure 2:
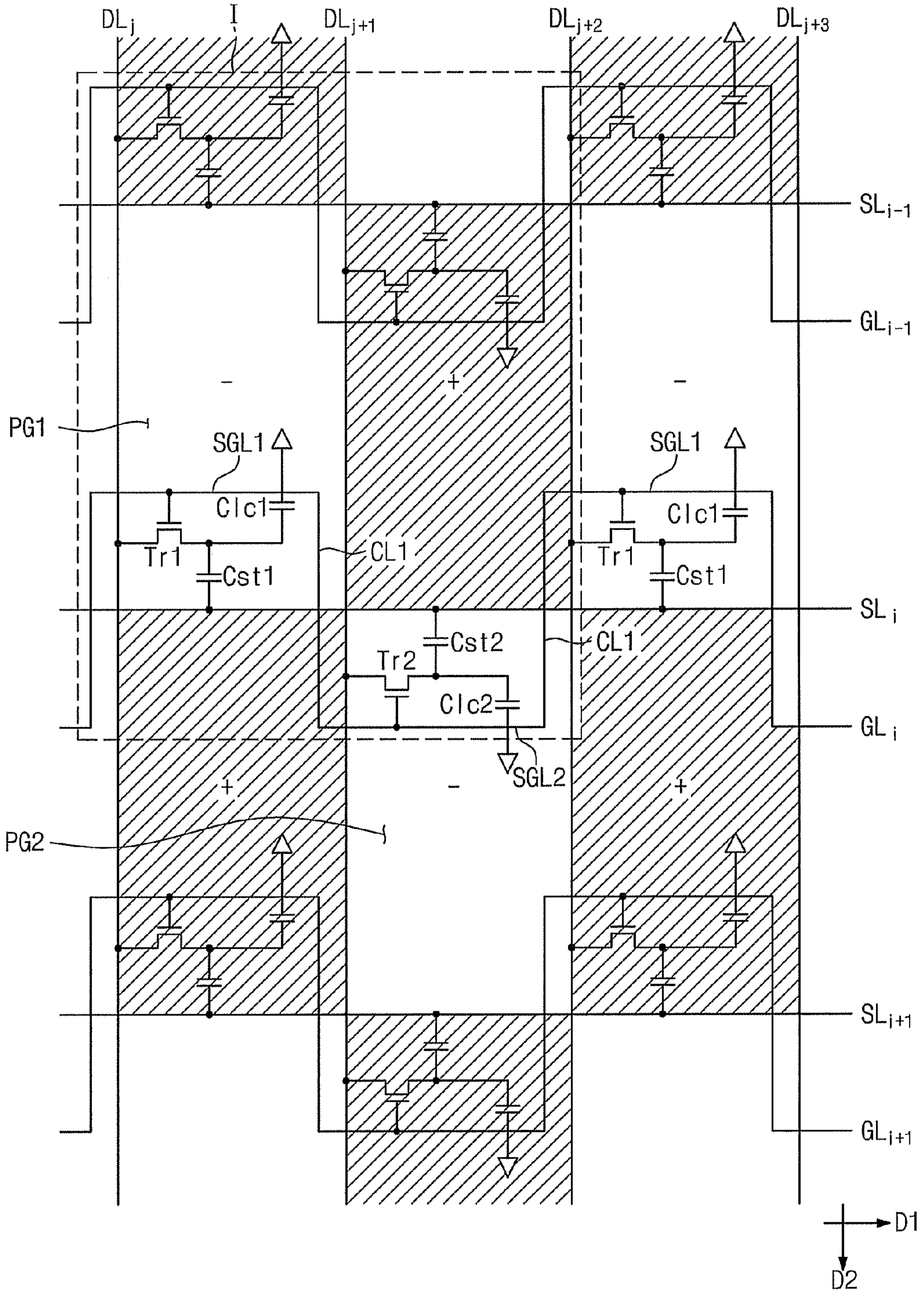
FIG. 2 is an equivalent circuit diagram showing exemplary pixels arranged in an exemplary display panel of FIG. 1.

FIG. 2 is an equivalent circuit diagram showing exemplary pixels arranged in an exemplary display panel of FIG. 1. In FIG. 2, only a previous pixel row and a present pixel row will be described as an example of the present embodiment.

Referring to FIG. 2, the display panel 300 includes a plurality of data lines DLj, DLj+1, DLj+2, and DLj+3, a plurality of gate lines GLi−1, GLi, and GLi+1, and a plurality of storage lines SLi−1, SLi, and SLi+1. The storage lines SLi−1, SLi, and SLi+1 are extended in a first direction D1, and the data lines DLj, DLj+1, DLj+2, and DLj+3 are extended in a second direction D2 that is substantially perpendicular to the first direction D1. The storage lines SLi−1, SLi, and SLi+1 and the data lines DLj, DLj+1, DLj+2, and DLj+3 substantially have a stripe shape. The gate lines GLi−1, GLi, and GLi+1 are extended mainly in the first direction D1 and bent in a square wave form. In particular, the gate lines GLi−1, GLi, and GLi+1 extend from the gate driving circuit 230 and include sub gate lines SGL1, SGL2 extending in the first direction D1, and connecting lines CL1 extending in the second direction D2 connecting the sub gate lines SGL1, SGL2 of the respective gate lines GLi−1, GLi, and GLi+1 together, as will be further described below. Thus the gate lines GLi−1, GLi, and GLi+1, including the respective connecting lines CL1 and the sub gate lines SGL1, SGL2, form the shape of a square wave.

Each pixel row includes a first pixel group PG1 and a second pixel group PG2. In each pixel row, the first pixel group PG1 includes odd-numbered pixels, and the second pixel group PG2 includes even-numbered pixels. Each of the odd-numbered pixels includes a first switching device Tr1, a first liquid crystal capacitor Clc1, and a first storage capacitor Cst1, and each of the even-numbered pixels includes a second switching device Tr2, a second liquid crystal capacitor Clc2, and a second storage capacitor Cst2.

In an exemplary embodiment, the i-th gate line GLi includes a plurality of the first sub gate lines SGL1, a plurality of the second sub gate lines SGL2, and a plurality of the first connection lines CL1. The first and second sub gate lines SGL1 and SGL2 are extended in the first direction D1, and the first connection lines CL1 are extended in the second direction D2. The first sub gate lines SGL1 are electrically connected with odd-numbered pixels included in the first pixel group PG1 of an i-th pixel row in a one-to-one correspondence relationship. The second sub gate lines SGL2 are electrically connected with even-numbered pixels included in the second pixel group PG2 of an (i−1)-th pixel row in a one-to-one correspondence relationship.

As shown in FIG. 2, the first switching device Tr1 arranged in the first pixel group PG1 of the i-th pixel row includes a gate electrode connected to a corresponding first sub gate line SGL1, a source electrode connected to a corresponding data line such as DLj and DLj+2, and a drain electrode connected to a first electrode of the first liquid crystal capacitor Clc1. The first liquid crystal capacitor Clc1 includes a pixel electrode that serves as the first electrode, a common electrode that serves as a second electrode, and a liquid crystal layer interposed between the pixel electrode and the common electrode. The common electrode receives a direct current voltage.

The first storage capacitor Cst1 is connected in parallel to the first liquid crystal capacitor Clc1. Particularly, the first storage capacitor Cst1 includes a pixel electrode that serves as a first electrode, an i-th storage line SLi that serves as a second electrode, and a dielectric layer (not shown) interposed between the i-th storage line SLi and the pixel electrode, where the pixel electrode may also be the first electrode of the first liquid crystal capacitor CLc1. As an example of the present invention, the dielectric layer includes a gate insulating film and a semiconductor layer, as will be further described below with respect to FIG. 4A.

The i-th storage line SLi receives an alternating current voltage. Thus, a voltage charged in the first liquid crystal capacitor Clc1 is boosted up by the first storage capacitor Cst1 when the alternating current voltage is transited from a low level to a high level. Thus, the first storage capacitor Cst1 may increase a charge holding period of the first liquid crystal capacitor Clc1.

Meanwhile, the second switching device Tr2 included in the second pixel group PG2 of the (i−1)-th pixel row includes a gate electrode connected to a corresponding second sub gate line SGL2, a source electrode connected to a corresponding data line such as DLj+1 and DLj+3, and a drain electrode connected to a first electrode of the second liquid crystal capacitor Clc2. The second liquid crystal capacitor Clc2 includes a pixel electrode that serves as the first electrode thereof, a common electrode that serves as a second electrode thereof, and a liquid crystal layer interposed between the pixel electrode and the common electrode. The common electrode receives the direct current voltage.

The second storage capacitor Cst2 is connected in parallel to the second liquid crystal capacitor Clc2. Particularly, the second storage capacitor Cst2 includes a pixel electrode that serves as a first electrode, the i-th storage line SLi that serves as a second electrode, and a dielectric layer (not shown) interposed between the i-th storage line SLi and the pixel electrode, where the pixel electrode may also be the first electrode of the second liquid crystal capacitor CLc2. As an example of the present invention, the dielectric layer includes a gate insulating film and a semiconductor layer, as will be further described below with respect to FIG. 4A.

As described above, the i-th storage line SLi receives the alternating current voltage. Thus, a voltage charged in the second liquid crystal capacitor Clc2 is boosted up by the second storage capacitor Cst2 when the alternating current voltage is transited from a low level to a high level. Thus, the second storage capacitor Cst2 may increase a charge holding period of the second liquid crystal capacitor Clc2.

Figure 3:
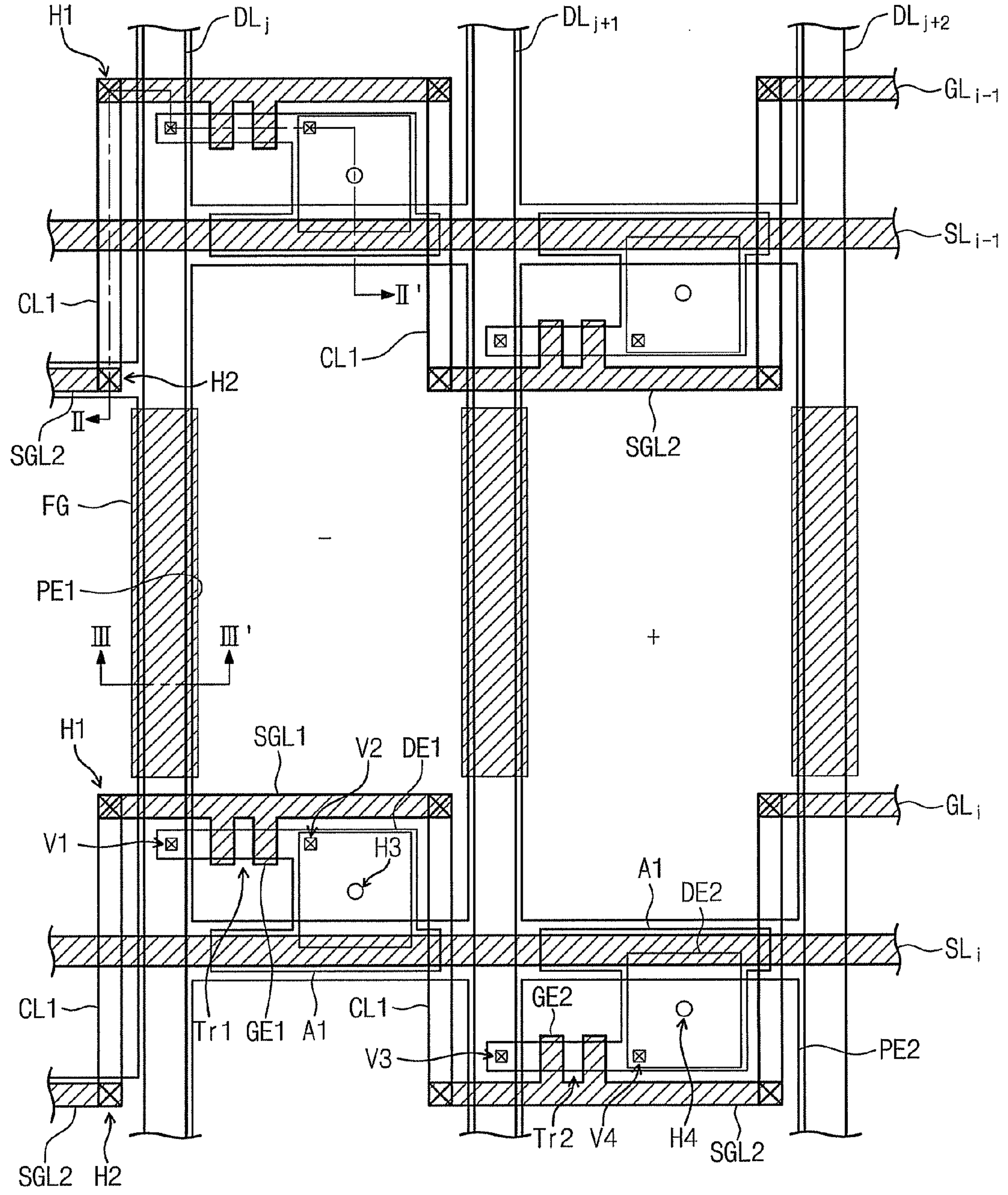
FIG. 3 is a layout diagram showing portion I of an exemplary array substrate of FIG. 2.
Figure 4A:
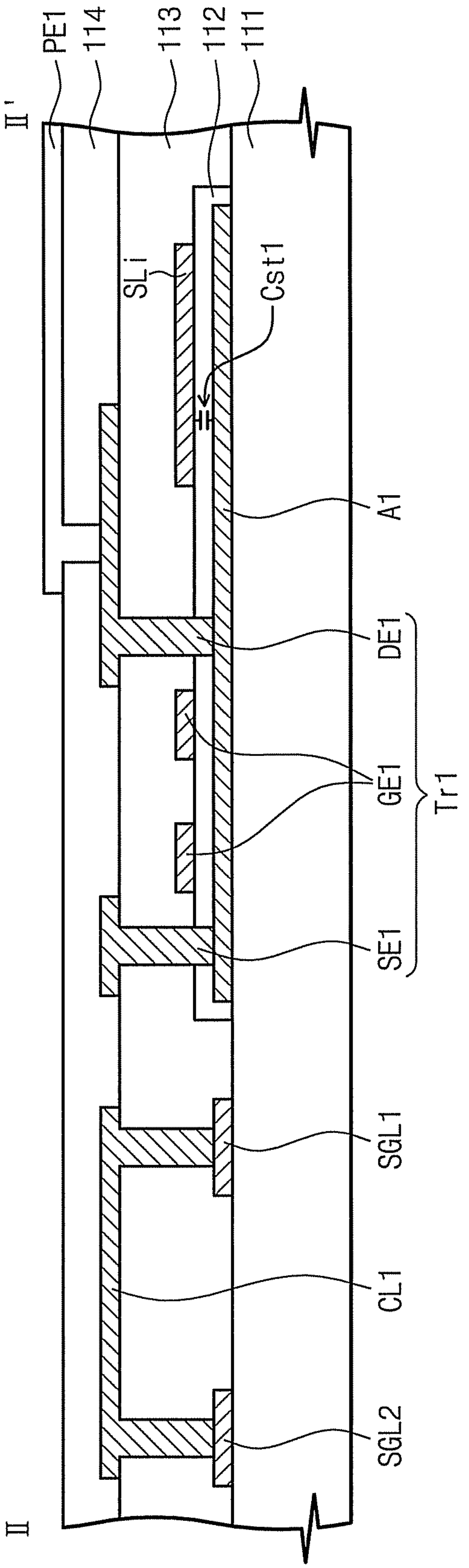
FIG. 4A is a cross-sectional view taken along line II-II' shown in FIG. 3.
Figure 4B:
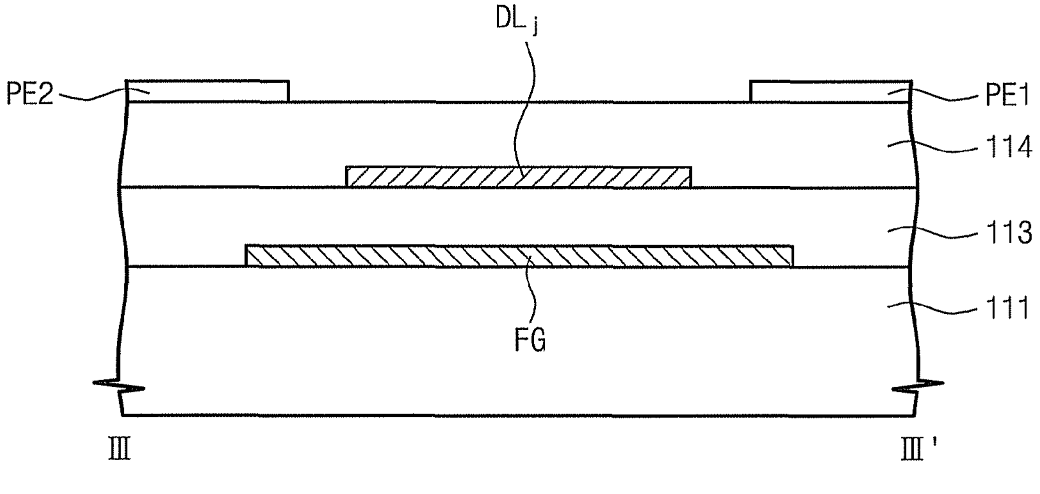
FIG. 4B is a cross-sectional view taken along line III-III' shown in FIG. 3.

FIG. 3 is a layout diagram showing portion I of the exemplary array substrate of FIG. 2, FIG. 4A is a cross-sectional view taken along line II-II' shown in FIG. 3, and FIG. 4B is a cross-sectional view taken along line III-III' shown in FIG. 3.

The display panel includes an array substrate, an opposite substrate facing the array substrate, and a liquid crystal layer interposed between the array substrate and the opposite substrate. In FIGS. 3 to 4B, a layout diagram and cross-sectional views of the array substrate will be illustrated.

Referring to FIGS. 3, 4A, and 4B, a silicon layer is deposited on a base substrate 111 such as by a low pressure chemical vapor deposition ("LPCVD") method. When a laser light is irradiated onto the silicon layer, the silicon layer is crystallized to form a polysilicon layer. The polysilicon layer is patterned such as through a dry etching process to complete an active layer A1.

A gate insulating layer 112 is deposited on the base substrate 111 to cover the active layer A1 such as by a plasma enhanced chemical vapor deposition ("PECVD") method. As an example of the present invention, the gate insulating layer 112 has a thickness of about 1000 Å.

A gate metal is formed on the gate insulating layer 112 and the base substrate 111. Then, the gate metal is patterned such as through a dry etching process to form a floating gate FG, the first sub gate line SGL1, and the second sub gate line SGL2 on the base substrate 111 and to form the first gate electrode GE1 and the i-th storage line SLi on the gate insulating layer 112.

The floating gate FG is formed in a region corresponding to a region where a j-th data line DLj is to be formed. The first sub gate line SGL1 and the second sub gate line SGL2 are extended in the first direction D1 (shown in FIG. 2) and spaced apart from each other by a predetermined distance. The i-th storage line SLi is extended in the first direction D1 and arranged between the first sub gate line SGL1 and the second sub gate line SGL2. Also, the i-th storage line SLi faces the active layer A1 while interposing the gate insulating layer 112 therebetween, thereby forming the storage capacitor Cst1.

Then, after the gate metal is patterned, ions are injected into the active layer A1 to form a source part and a drain part in the active layer A1. Particularly, the active layer A1 is doped by ion implantation of positive ions such as boron (B) in order to form a P-type polysilicon transistor, or the active layer A1 is doped by ion implantation using negative ions such as phosphorus (P) in order to form an N-type polysilicon transistor. Therefore, either the P-type polysilicon transistor or the N-type polysilicon transistor may be formed according to a doping process.

After the ion injection process, an inter-insulating layer 113 is deposited on the base substrate 111, such as by the PECVD method, to cover the first and second sub gate lines SGL1 and SGL2, the first gate electrode GE1, and the i-th storage line SLi. The inter-insulating layer 113 planarizes a surface of the array substrate.

The inter-insulating layer 113 is provided with a first via hole V1 and a second via hole V2, which are formed therethrough, corresponding to the source part and the drain part of the active layer A1, respectively. The gate insulating layer 112 is partially removed from regions corresponding to the first via hole V1 and the second via hole V2 to expose the source part and the drain part of the active layer A1. Also, a first contact hole H1 and a second contact hole H2 are formed through the inter-insulating layer 113 to expose ends of the first and second sub gate lines SGL1 and SGL2.

Then, a data metal is formed on the inter-insulating layer 113. The data metal is patterned, such as through the dry etching process, so that the data line DLj, the first connection line CL1, the first source electrode SE1, and the first drain electrode DE1 are formed on the inter-insulating layer 113. The first source electrode SE1 is integrally formed with the data line DLj, and the first drain electrode DE1 is formed in a region spaced apart from the data line DLj by a predetermined distance. Also, when viewed in a plan view, the first and second drain electrodes DE1 and DE2 are partially overlapped with the i-th storage line SLi.

The first source electrode SE1 makes contact with the source part of the active layer A1 through the first via hole V1, and the first drain electrode DE1 makes contact with the drain part of the active layer A1 through the second via hole V2, as shown in FIG. 4A. Thus, the first switching device Tr1 of polysilicon-type material is completed.

As also shown in FIG. 4A, the first connection line CL1 is electrically connected to the first and second sub gate lines SGL1 and SGL2 through the first and second contact holes H1 and H2 formed through the inter-insulating layer 113, respectively. Thus, the first and second sub gate lines SGL1 and SGL2 that are spaced apart from each other by a predetermined space may be electrically connected to each other.

When viewed in a plan view, the j-th data line DLj is partially overlapped with the floating gate FG. That is, the j-th data line DLj has a width that is smaller than that of the floating gate FG, as can also be seen in FIG. 4B.

After the data metal is patterned, a protective layer 114 is deposited on the array substrate. The protective layer 114 is formed over on the entire surface of the array substrate to protect patterns formed on the array substrate. A third contact hole H3 through which the first drain electrode DE1 is exposed is formed through the protective layer 114.

Then, a transparent conductive layer, including for example indium tin oxide ("ITO") or indium zinc oxide ("IZO"), is formed on the protective layer 114. The transparent conductive layer is patterned to form a first pixel electrode PE1. The first pixel electrode PE1 is electrically connected to the first drain electrode DE1 through the third contact hole H3 formed through the protective layer 114. Thus, the first pixel electrode PE1 receives a data voltage output from the first switching device Tr1.

As shown in FIGS. 3 and 4B, a parasitic capacitance is generated between the j-th data line DLj and the first and second pixel electrodes PE1 and PE2, so that liquid crystal molecules arranged on the upper portion of the array substrate are abnormally aligned at a border area between the j-th data line DLj and the first or second pixel electrode PE1 and PE2 or other adjacent pixel electrode within a pixel row. In the present exemplary embodiment, the floating gate FG has a width that is larger than that of the j-th data line DLj and is partially overlapped by end portions of the first and second pixel electrodes PE1 and PE2. Thus, the floating gate FG may serve as a light blocking layer to prevent a light leakage caused by the liquid crystal molecules that are abnormally aligned at the border area between the j-th data line DLj and the first or second pixel electrode PE1 and PE2.

The second switching device Tr2 may include a second gate electrode GE2 protruding from second sub gate line SGL2, a second source electrode protruding from an adjacent data line, a second drain electrode DE2, third and fourth via holes V3 and V4 to connect the second source electrode and the second drain electrode DE2 to source and drain parts of an active layer, and a fourth hole H4 to connect a second pixel electrode PE2 to the second drain electrode DE2. Although the second switching device Tr2 is not described in detail with respect to FIGS. 3, 4A and 4B, since the second switching device Tr2 has a same or substantially same circuit configuration as that of the first switching device Tr1, the detailed descriptions of the second switching device Tr2 will be omitted.

Although not shown in FIGS. 3, 4A and 4B, the opposite substrate includes a common electrode facing the first and second pixel electrodes PE1 and PE2. Thus, the first liquid crystal capacitor Clc1 shown in FIG. 2 is defined by the first pixel electrode PE1, the liquid crystal layer, and the common electrode, and the second liquid crystal capacitor Clc2 is defined by the second pixel electrode PE2, the liquid crystal layer, and the common electrode. The opposite substrate may further include a color filter layer having red, green, and blue color pixels and a black matrix having a light shielding material.

In FIGS. 3, 4A and 4B, the first and second switching devices Tr1 and Tr2 including the polysilicon transistor have been illustrated. However, according to another exemplary embodiment of the present invention, the first and second switching devices Tr1 and Tr2 may include an amorphous polysilicon transistor.

Figure 5:
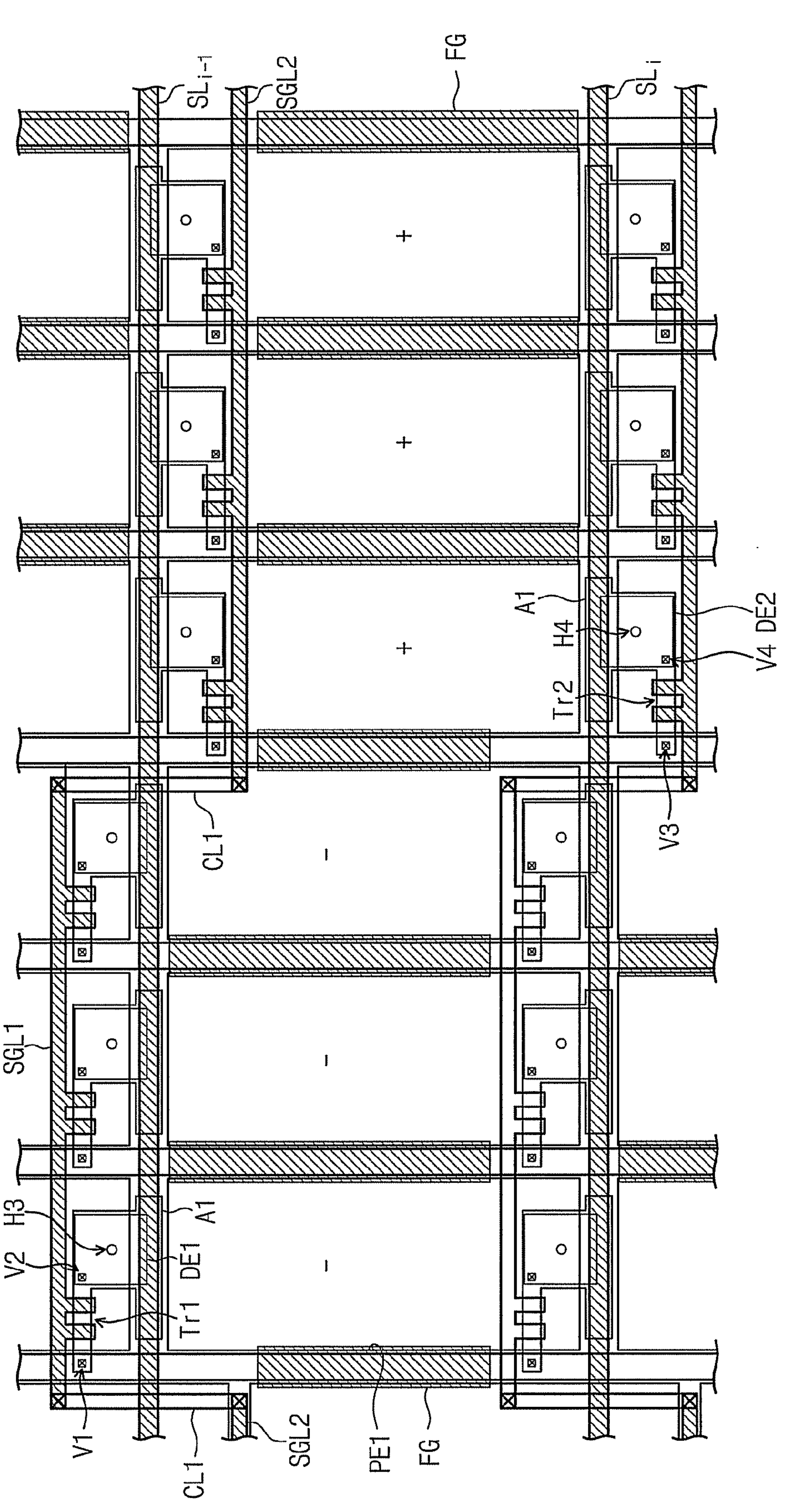
FIG. 5 is a layout diagram showing another exemplary embodiment of an array substrate according to the present invention.

FIG. 5 is a layout diagram showing another exemplary embodiment of an array substrate according to the present invention. In FIG. 5, the same reference numerals denote the same elements in FIG. 3, and thus the detailed descriptions of the same elements will be omitted.

Referring to FIG. 5, an i-th gate line GLi includes a plurality of first sub gate lines SGL1, a plurality of second sub gate lines SGL2, and a plurality of first connection lines CL1. Each of the first sub gate lines SGL1 are commonly connected to three adjacent pixels, and each of the second sub gate lines SGL2 are commonly connected to three adjacent pixels different from the three pixels connected to each of the first sub gate lines SGL1.

In FIGS. 2 and 3, the first sub gate lines SGL1 are connected with odd-numbered pixels PG1 in a one-to-one correspondence relationship, and the second sub gate lines SGL2 are connected with even-numbered pixels PG2 in a one-to-one correspondence relationship.

However in FIG. 5, unlike the structure shown in FIG. 3, groups each of which having neighboring three pixels are alternately connected to the first sub gate lines SGL1 and the second sub gate lines SGL2. Thus, the polarity of the data voltage is inverted at every pixel in FIGS. 2 and 3, however, the polarity of the data voltage is inverted at every three pixels in FIG. 5.

Accordingly, the numbers of the first connection lines CL1 included in the i-th gate line GLi decreases to ⅓ of the number of the first connection lines CL1 in the array substrate of FIGS. 2 and 3, thereby reducing a contact resistance of the i-th gate line GLi.

Figure 6:
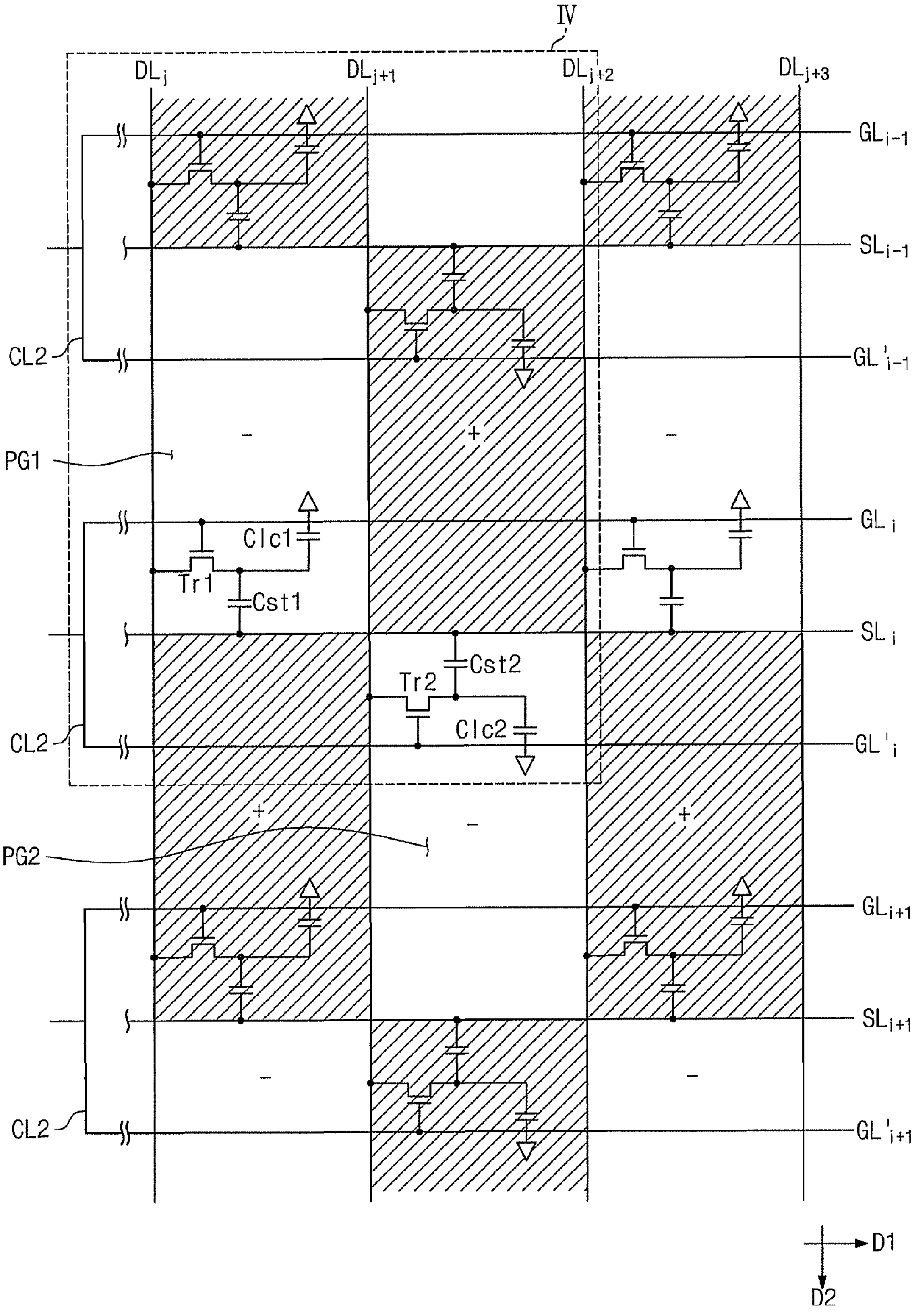
FIG. 6 is an equivalent circuit diagram showing another exemplary embodiment of pixels according to the present invention.
Figure 7:
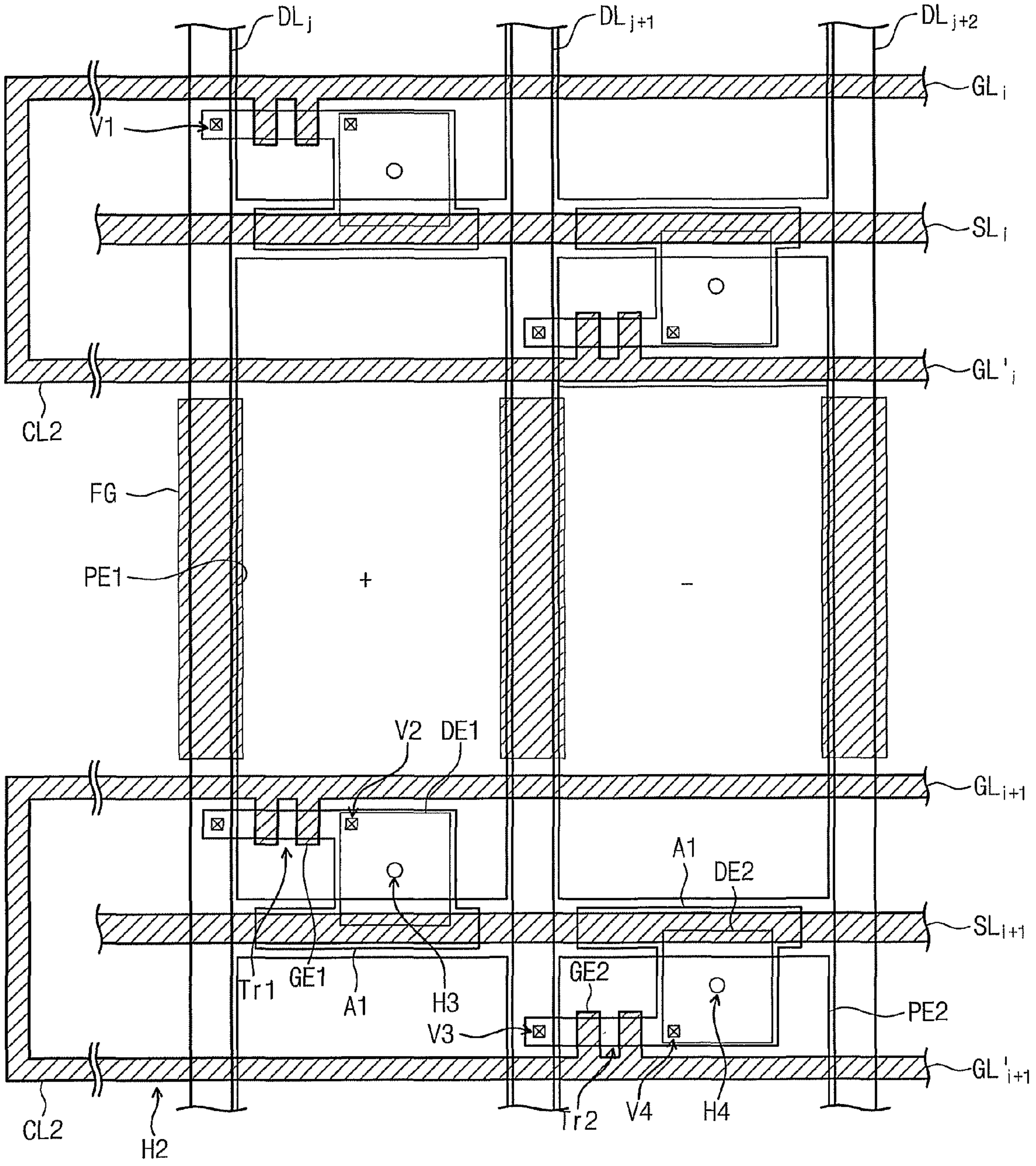
FIG. 7 is a layout diagram showing portion IV of an exemplary array substrate of FIG. 6.

FIG. 6 is an equivalent circuit diagram showing another exemplary embodiment of pixels according to the present invention, and FIG. 7 is a layout diagram showing portion IV of an exemplary array substrate of FIG. 6. In FIGS. 6 and 7, the same reference numerals denote the same elements in FIGS. 2 and 3, and thus the detailed descriptions of the same elements will be omitted.

Referring to FIGS. 6 and 7, a display panel includes a plurality of data lines DLj, DLj+1, DLj+2, and DLj+3, a plurality of first gate lines GLi−1, GLi, and GLi+1, a plurality of second gate lines GL'i−1, GL'I, and GLi+1, and a plurality of storage lines SLi−1, SLi, and SLi+1. The storage lines SLi−1, SLi, and SLi+1 are extended in a first direction D1, and the data lines DLj, DLj+1, DLj+2, and DLj+3 are extended in a second direction D2 that is substantially perpendicular to the first direction D1. The storage lines SLi−1, SLi, and SLi+1 and the data lines DLj, DLj+1, DLj+2, and DLj+3 substantially have a stripe shape. The first gate lines GLi−1, GLi, and GLi+1 and the second gate lines GLi−1, GL'i, and GL'i+1 are extended in the first direction D1 to substantially have the stripe shape.

Each pixel row includes a first pixel group PG1 and a second pixel group PG2. In each pixel row, the first pixel group PG1 includes odd-numbered pixels, and the second pixel group PG2 includes even-numbered pixels. Each of the odd-numbered pixels includes a first switching device Tr1, a first liquid crystal capacitor Clc1, and a first storage capacitor Cst1, and each of the even-numbered pixels includes a second switching device Tr2, a second liquid crystal capacitor Clc2, and a second storage capacitor Cst2.

In the exemplary embodiment of the present invention, the i-th first gate line GLi is electrically connected with the odd-numbered pixels included in the first pixel group PG1 of an i-th pixel row in a one-to-one correspondence relationship. The i-th second gate line GL'i is electrically connected with the even-numbered pixels included in the second pixel group PG2 of the i-th pixel row in a one-to-one correspondence relationship.

The i-th storage line SLi is commonly connected to the first pixel group PG1 and the second pixel group PG2 of the i-th pixel row.

The i-th first gate line GLi and the i-th second gate line GL'i are electrically connected to each other through a second connection line CL2 at a present stage. The i-th second connection line CL2 is directly connected to the gate driving circuit 230 shown in FIG. 1 and receives the gate signal to provide the gate signal to the i-th first and second gate lines GLi and GL'i.

As shown in FIGS. 6 and 7, according to another exemplary embodiment of the present invention, since the display panel further includes the i-th second connection line CL2 in order to connect the i-th first gate line GLi and the i-th second gate line GLi, the contact resistance between the i-th first gate line GLi and the i-th second gate line GL'i may be reduced.

Figure 8:
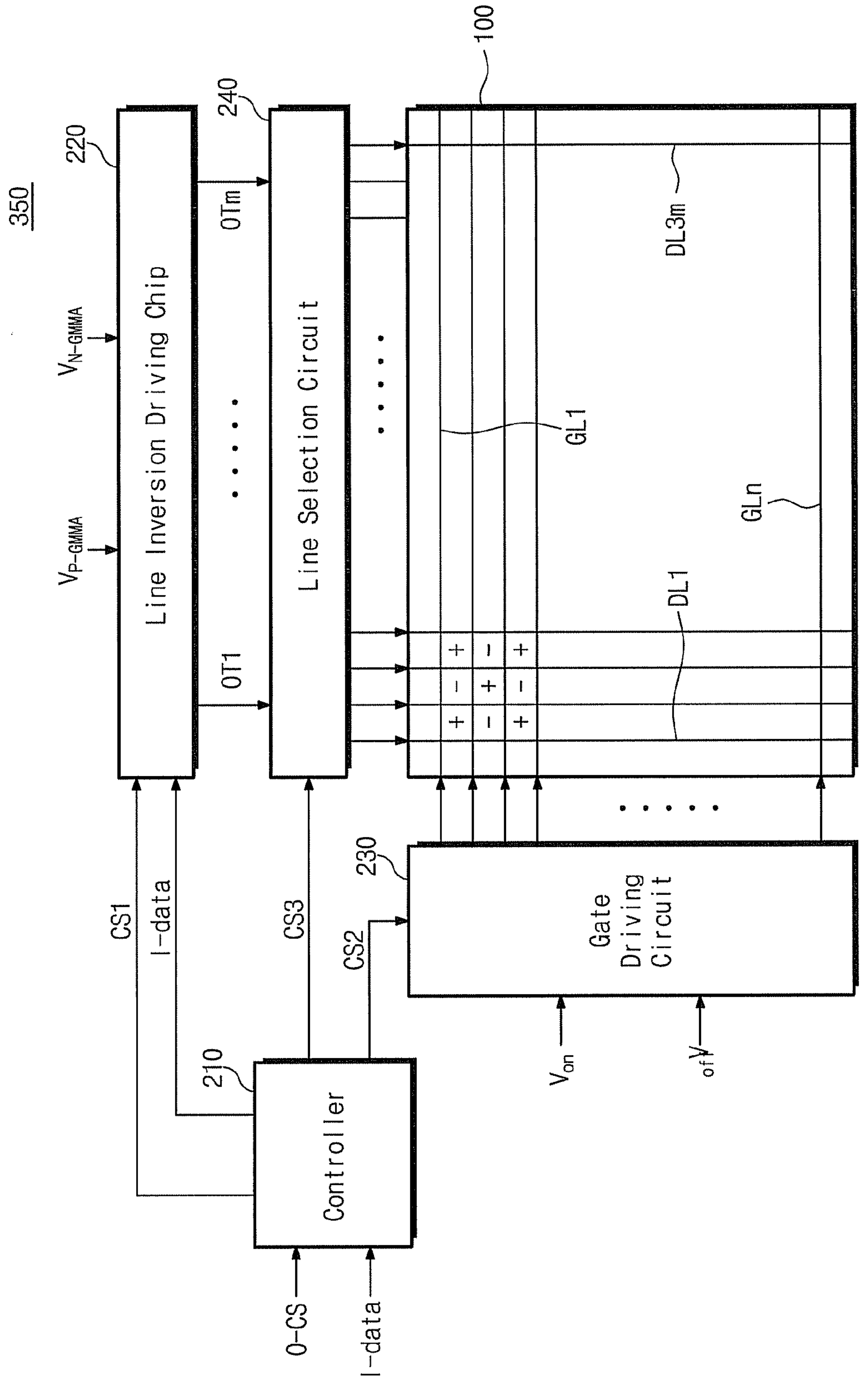
FIG. 8 is a block diagram showing another exemplary embodiment of an LCD according to the present invention.
Figure 9:
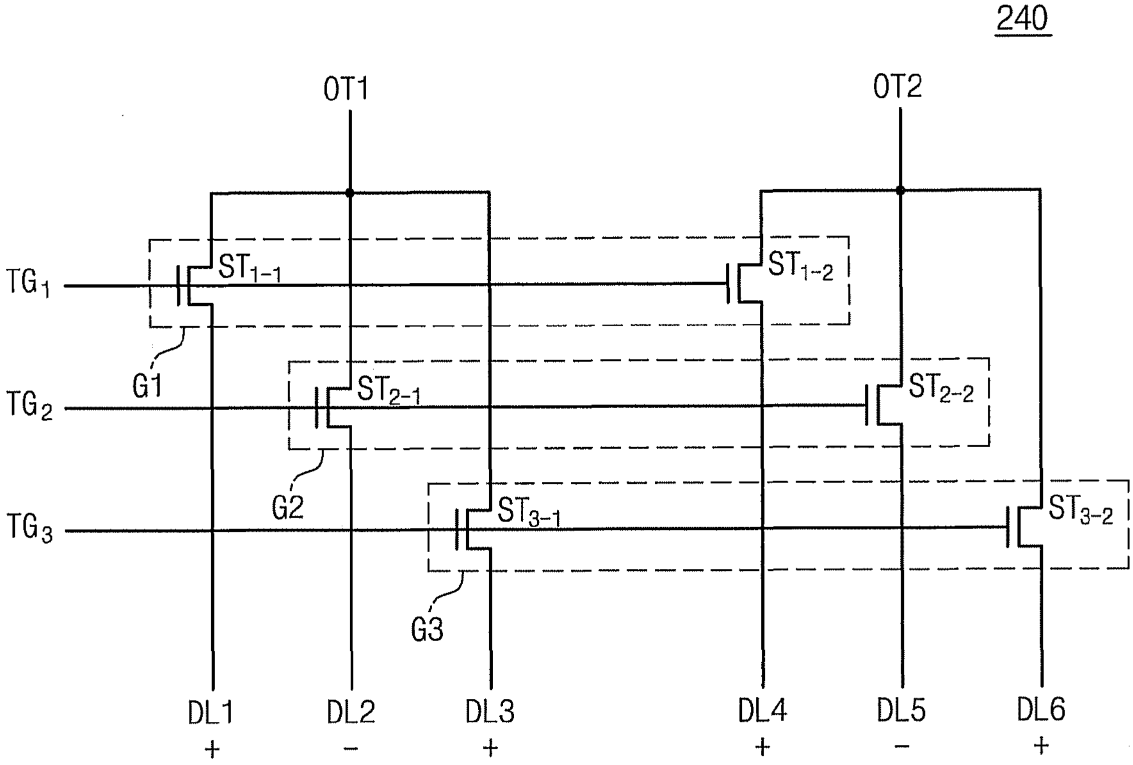
FIG. 9 is a circuit diagram showing an exemplary line selection circuit of FIG. 8.

FIG. 8 is a block diagram showing another exemplary embodiment of an LCD according to the present invention, and FIG. 9 is a circuit diagram showing an exemplary line selection circuit of FIG. 8. In FIG. 8, the same reference numerals denote the same elements in FIG. 1, and thus the detailed descriptions of the same elements will be omitted.

Referring to FIGS. 8 and 9, an LCD 350 according to another exemplary embodiment of the present invention further includes a line selection circuit 240. The line selection circuit 240 is arranged between a line inversion driving chip 220 and first to 3m-th data lines DL1~DL3*m* included in a display panel 100.

The line inversion driving chip 220 includes first to m-th output terminals OT1~OTm, and the line inversion driving chip 220 alternately receives a positive gamma reference voltage $V_{P\text{-}GMMA}$ and a negative gamma reference voltage $V_{N\text{-}GMMA}$ at every 1H/3 period. The line inversion driving chip 220 inverts an image data I-data to a data voltage having a positive polarity based on the positive gamma reference voltage $V_{P\text{-}GMMA}$, and inverts the image data I-data to a data voltage having a negative polarity based on the negative gamma reference voltage $V_{N\text{-}GMMA}$. Thus, the line inversion driving chip 220 alternately outputs the data voltage having the positive polarity and the data voltage having the negative polarity to the first to m-th output terminals OT1~Otm at every 1H/3 period.

The line selection circuit 240 is electrically connected to the first to m-th output terminals OT1~Otm and alternately receives the data voltage having the positive polarity and the data voltage having the negative polarity at every H/3 period. Also, the line selection circuit 240 is electrically connected to the first to 3m-th data lines DL1~DL3*m* arranged in the display panel 100.

As shown in FIG. 9, the line selection circuit 240 applies the data voltage having the positive polarity to (3m−2)-th data lines (e.g. DL1, DL4) during an earlier H/3 period among the 1H period, applies the data voltage having the negative polarity to (3m−1)-th data lines (e.g. DL2, DL5) during an intermediate period among the 1H period, and applies the data voltage having the positive polarity to 3m-th data lines (e.g. DL3, DL6) during a later H/3 period among the 1H period. That is, the polarity of the data voltage is inverted at every 1H/3 period.

The line selection circuit 240 includes a first group G1 having a plurality of first selection devices ST1, a second group G2 having a plurality of second selection devices ST2, and a third group G3 having a plurality of third selection devices ST3.

The first selection devices ST1, such as ST1-1 and ST1-2, apply the data voltage provided through a corresponding output terminal to the (3m−2)-th data lines (e.g. DL1, DL4) in response to a first selection signal TG1 generated during the earlier 1H/3 period at a high state. The second selection devices ST2, such as ST2-1 and ST2-2, apply the data voltage provided through a corresponding output terminal to the (3m−1)-th data lines (e.g. DL2, DL5) in response to a second selection signal TG2 generated during the intermediate 1H/3 period at the high state. Also, the third selection devices ST3, such as ST3-1 and ST3-2, apply the data voltage provided through a corresponding output terminal to the 3m-th data lines (e.g. DL3, DL6) in response to a third selection signal TG3 generated during the later H/3 period at the high state.

Thus, the line selection circuit 240 sequentially applies the data voltage to the (3m−2)-th data lines (DL1, DL4), the (3m−1)-th data lines (DL2, DL5), and the 3m-th data lines (D3, D6).

Each pixel arranged in the display panel 100 may have a same circuit configuration or a substantially same circuit configuration as one of those of the pixels shown in FIGS. 2 to 7. Thus, the detailed descriptions about the circuit configuration of the pixels arranged in the display panel 100 of the LCD 350 will be omitted.

According to the display device, the line inversion driving chip outputs the data voltage corresponding to one row during the 1H period, and the polarity of the data voltage is inverted at every 1H period. Also, the display panel divides one pixel row into two pixel groups and includes two gate lines in order to drive the two pixel groups, respectively.

Thus, although the display panel receives the data voltage inverted at every row from the line inversion driving chip, the display panel may be driven in a dot inversion method.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A display device comprising:

a controller receiving an image data from an external device, outputting the image data in synchronization with a first timing signal, and outputting a second timing signal;

a line inversion driving chip receiving the image data and inverting the image data to a first data voltage having a first polarity and a second data voltage having a second polarity different from the first polarity based on a positive gamma and a negative gamma alternately applied at every horizontal scanning period, where a horizontal scanning period is a 1H period, to alternately output the first data voltage and the second data voltage at a period that is equal to or less than the 1H period;

a gate driving circuit outputting a gate signal during the 1H period in response to the second timing signal; and a display panel comprising:

a plurality of gate lines sequentially receiving the gate signal;

a plurality of data lines intersecting with the gate lines, insulated from the gate lines, and receiving the first and second data voltages at every 1H from the line inversion driving chip; and a plurality of pixels that receives the first and second data voltages in response to the gate signal and are arranged in a plurality of pixel rows to display an image, the plurality of pixels arranged in each of the plurality of pixel rows being divided into a first pixel group and a second pixel group receiving the first and second data voltages, respectively, the first and second pixel groups being alternately arranged in the each of the plurality of pixel rows, and a polarity of a data voltage applied to the first and second pixel groups being inverted at every pixel row, and wherein, the first pixel group is connected to corresponding data lines, the second pixel group is connected to corresponding data lines different from the data lines connected to the first pixel group.

2. The display device of claim 1, wherein the pixels of the first pixel group and the pixels of the second pixel group are alternately positioned at every one or more pixels in each of the pixel rows.

3. The display device of claim 1, wherein the first data voltage having the first polarity is applied to a first pixel group of a present pixel row and a second pixel group of a previous pixel row with respect to each pixel row, and the second data voltage having the second polarity is applied to a second pixel group of the present pixel row and a first pixel group of the previous pixel row.

4. The display device of claim 3, wherein a present gate line among the gate lines comprises:

at least one first sub gate line electrically connected to the first pixel group of the present pixel row;

at least one second sub gate line electrically connected to the second pixel group of the previous pixel row; and at least one connection line electrically connecting the at least one first sub gate line and the at least one second sub gate line.

5. The display device of claim 4, wherein the at least one first sub gate line overlaps with the pixels included in the first pixel group of the present pixel row in a one-to-one correspondence relationship, and the at least one second sub gate line overlaps with the pixels included in the second pixel group of the previous pixel row in a one-to-one correspondence relationship.

6. The display device of claim 4, wherein the at least one first sub gate line and the at least one second sub gate line are extended in a first direction, and the data lines and the at least one connection line are extended in a second direction that is substantially perpendicular to the first direction.

7. The display device of claim 6, wherein the at least one first sub gate line is formed on a same layer as that of the at least one second sub gate line, and the at least one connection line is formed on a same layer as that of the data lines.

8. The display device of claim 4, wherein the at least one first sub gate line overlaps with the first and second pixel groups of the present pixel row, and the at least one second sub gate line overlaps with the first and second pixel groups of the previous pixel row.

9. The display device of claim 8, wherein the display panel comprises a display area in which the pixels are arranged to display the image and a peripheral area adjacent to the display area, and the at least one connection line electrically connects the at least one first sub gate line to the at least one second sub gate line in the peripheral area, and the at least one connection line, the at least one first sub gate line, and the at least one second sub gate line are formed on a same layer.

10. The display device of claim 9, wherein the at least one connection line is directly connected to the gate driving circuit to receive the gate signal and apply the gate signal to the first and second sub gate lines.

11. The display device of claim 1, wherein the display panel further comprises a plurality of storage lines, and a present storage line is overlapped with a first pixel group of a present pixel row and a second pixel group of a previous pixel row.

12. The display device of claim 11, wherein the first pixel group comprises a first liquid crystal capacitor including a first pixel electrode receiving the first data voltage, a common electrode facing the first pixel electrode, and a first liquid crystal layer interposed between the first pixel electrode and the common electrode, and the second pixel group comprises a second liquid crystal capacitor including a second pixel electrode receiving the second data voltage, the common electrode facing the second pixel electrode, and a second liquid crystal layer interposed between the second pixel electrode and the common electrode.

13. The display device of claim 12, wherein the common electrode receives a direct current voltage, and the storage lines receive an alternating current voltage.

14. The display device of claim 13, wherein the alternating current voltage applied to the storage lines boosts up a first liquid crystal voltage and a second liquid crystal voltage respectively charged in the first and second liquid crystal capacitors.

15. The display device of claim 11, wherein the storage lines are extended in a row direction to have a stripe shape.

16. The display device of claim 1, further comprising a line selection circuit arranged between the line inversion driving chip and the display panel, wherein the line inversion driving chip comprises m output terminals, where m is a constant number equal to or larger than 1, the display panel comprises p×m data lines, where p is a constant number equal to or larger than 1, and the line selection circuit selects at least one data line among the p×m data lines to apply a data voltage output from the line inversion driving chip to selected data lines during a 1H/p period.

17. The display device of claim 16, wherein p equals 3, and the line inversion driving chip alternately outputs the first and second data voltages at every 1H/3 period.

18. A display device comprising:

a line inversion driving chip that outputs first and second data voltages, and inverts a polarity of the first and second data voltages;

a gate driving circuit that outputs gate signals; and, a display panel including a plurality of data lines that receives the first and second data voltages from the line inversion driving chip, a plurality of gate lines that receives the gate signals from the gate driving circuit, and a plurality of pixel rows, each pixel row of the plurality of pixel rows including pixels that are alternately arranged to receive gate signals from the gate driving circuit by adjacent gate lines of the plurality of gate lines, wherein the pixels arranged in the each pixel row of the plurality of pixel rows are divided into a first pixel group and a second pixel group receiving the first and second data voltages, respectively, and the first and second pixel groups are alternately arranged in the each pixel row of the plurality of pixel rows, wherein the first pixel group is connected to corresponding data lines, the second pixel group is connected to corresponding data lines different from the data lines connected to the first pixel group, wherein the display panel is driven by a dot inversion method.

19. A dot inversion method of driving a display panel of a display device, the method comprising:

providing image data to a line inversion driving chip of the display device;

inverting the image data to a first data voltage having a first polarity and a second data voltage having a second polarity different from the first polarity;

outputting the first data voltage and the second data voltage at a period that is equal to or less than a 1H period to the display panel, each pixel row of the display panel divided into a first pixel group and a second pixel group receiving the first and second data voltages, respectively, the first and second pixel groups being alternately arranged in the each pixel row, and the first pixel group being connected to corresponding data lines, the second pixel group being connected to corresponding data lines different from the data lines connected to the first pixel group;

outputting gate signals from a gate driving circuit during the 1H period in response to a second timing signal; and, inverting a polarity of a data voltage applied to the first and second pixel groups at every pixel row.

* * * * *